(12) United States Patent
Winterhalter et al.

(10) Patent No.: US 8,525,468 B2
(45) Date of Patent: Sep. 3, 2013

(54) MOTOR DRIVE SYSTEM WITH BUS VOLTAGE CONTROL

(75) Inventors: Craig R. Winterhalter, Cedarburg, WI (US); Robert H. Schmidt, Germantown, WI (US); Michael S. Baran, Milwaukee, WI (US); Todd M. Oestreich, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 621 days.

(21) Appl. No.: 12/751,975

(22) Filed: Mar. 31, 2010

(65) Prior Publication Data

US 2011/0241580 A1 Oct. 6, 2011

(51) Int. Cl.
*H02P 23/00* (2006.01)

(52) U.S. Cl.
USPC .......................................... 318/798; 318/801

(58) Field of Classification Search
USPC ................. 318/798, 799, 800, 801, 803, 805, 318/812
See application file for complete search history.

(56) References Cited

U.S. PATENT DOCUMENTS

| 5,652,485 | A  | * | 7/1997  | Spiegel et al.  | 318/147    |
|-----------|----|---|---------|-----------------|------------|
| 5,659,240 | A  | * | 8/1997  | King            | 320/134    |
| 7,135,829 | B1 | * | 11/2006 | Sorkin          | 318/400.07 |
| 7,221,121 | B2 | * | 5/2007  | Skaug et al.    | 318/807    |
| 2004/0021437 | A1 | * | 2/2004 | Maslov et al. | 318/254    |
| 2010/0018203 | A1 | * | 1/2010 | Richards      | 60/598     |

* cited by examiner

*Primary Examiner* — Rina Duda
(74) *Attorney, Agent, or Firm* — Fletcher Yoder, P.C.; R. Scott Speroff; John M. Miller

(57) ABSTRACT

A method for controlling a motor drive system, the system comprising an AC-DC converter coupled to a DC-AC inverter by a DC bus, a motor coupled to and driven by the inverter, and a load coupled to and driven by the motor is provided. The method includes accessing a motion profile for the motor and load and determining power losses of the converter, the inverter, the motor and the load. The method also includes controlling the voltage of the DC bus based upon the motion profile and the power losses to enhance the motor drive system efficiency, reliability and motor shaft performance.

20 Claims, 5 Drawing Sheets

MOTOR DRIVE SYSTEM WITH BUS VOLTAGE CONTROL

BACKGROUND

The invention relates generally to motor drive systems, and particularly to a motor drive system with bus voltage control.

Wide ranges of equipment, such as electric motor drive systems, are known and are in use for a variety of applications, such as in factory automation systems, power generation systems and so forth. Typically an electric drive is connected to a power source which provides electrical power to the load in a controlled manner. In alternating current (AC) motor drive systems, for example, electrical power is converted from an AC power source into direct current (DC) voltage via a converter. The DC voltage is then converted via an inverter coupled to the converter through a DC bus into AC voltage with controlled frequency, phase and amplitude which may be applied to drive the electric motor.

In certain motor drive systems, the magnitude of the bus voltage may be pre-determined for a particular motor and load combination based upon certain parameters such as AC power system voltage, load characteristics, velocity of the motor and so forth. Furthermore, the bus voltage of the DC bus is maintained as a constant value during operation of such systems. However, this may result in reduced efficiency of the motor drive systems. Further, power consumption of such systems may be substantial.

Accordingly, it would be desirable to develop a motor drive system with dynamic bus voltage control during operation of the system to enhance efficiency and reliability of such systems while maintaining or enhancing motion system performance.

BRIEF DESCRIPTION

Briefly, according to one embodiment of the present invention, a method for controlling a motor drive system, the system comprising an AC-DC converter coupled to a DC-AC inverter by a DC bus, a motor coupled to and driven by the inverter, and a load coupled to and driven by the motor is provided. The method includes accessing a motion torque-speed profile versus time for the motor and load and determining power losses of the converter, the inverter, the motor and the load. The method also includes controlling the voltage of the DC bus based upon the motion profile and the power losses.

In accordance with another aspect, a method for controlling a motor drive system, the system comprising an AC-DC converter coupled to a DC-AC inverter by a DC bus, a motor coupled to and driven by the inverter, and a load coupled to and driven by the motor is provided. The method includes accessing a motion torque-speed profile versus time for the motor and the load and determining a voltage profile of the DC bus based upon the motion torque-speed profile. The method also includes operating the motor drive system to drive the motor and the load, sensing at least one operating parameter of the converter, the inverter, the motor and the load and adjusting the voltage versus time profile of the DC bus based upon the motion profile and the sensed operating parameters.

In accordance with another aspect, a motor drive system is provided. The motor drive system includes an AC-DC converter configured to convert incoming AC voltage from a power source to DC voltage and a DC-AC inverter coupled to the AC-DC converter by a DC bus. The motor drive system also includes a motor coupled to and driven by the inverter, a load coupled to and driven by the motor and a controller operatively coupled to the converter, the inverter, the motor and the load and configured to control the voltage of the DC bus based upon at least one operating parameter of the converter, the inverter, the motor and the load.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a motor drive system with bus voltage control. In particular, the present technique utilizes operating parameters of the motor drive system for regulating the bus voltage of the system thereby enhancing the performance and efficiency of such systems.

Figure 1:
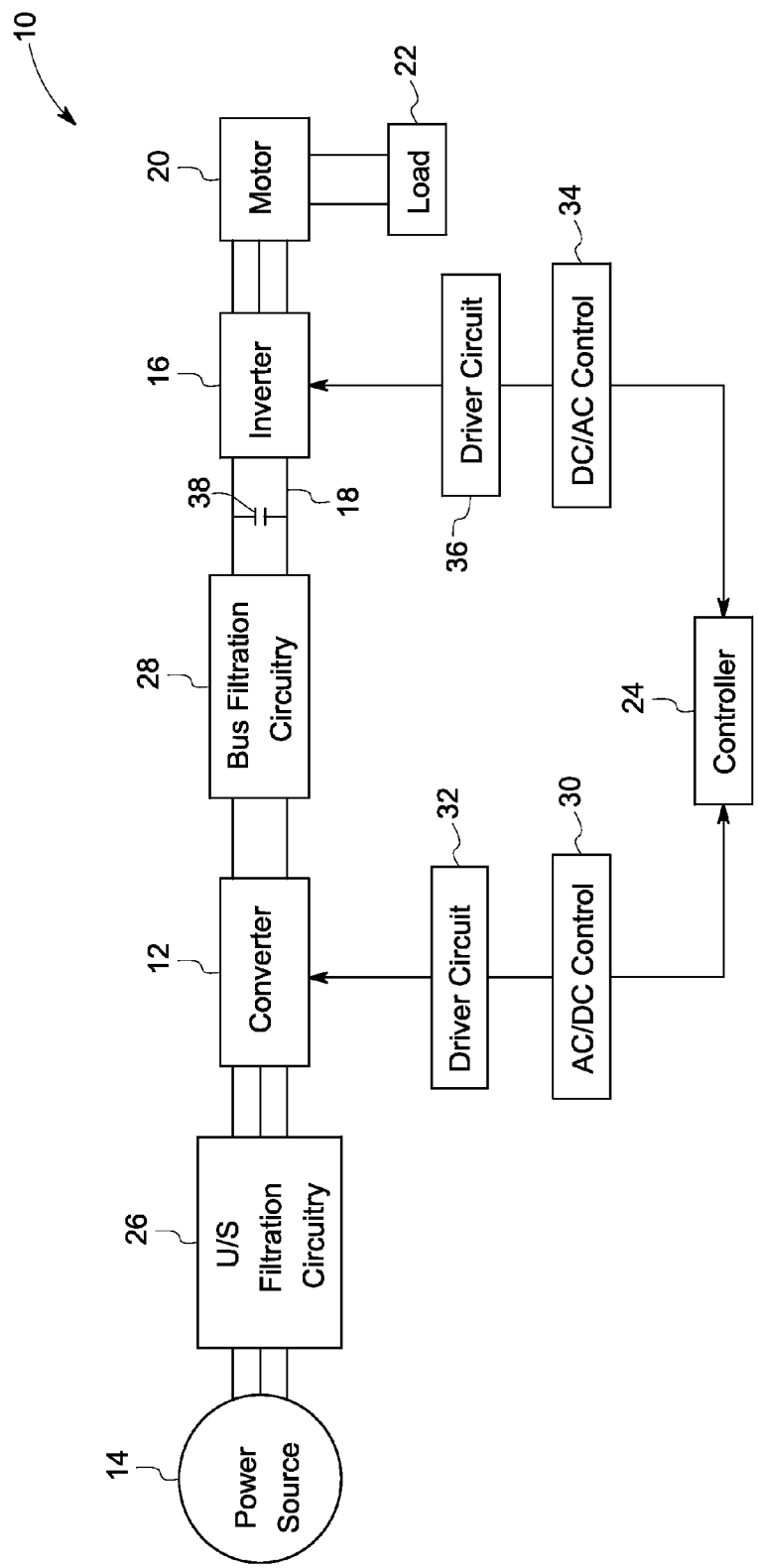
FIG. 1 illustrates a motor drive system with bus voltage control in accordance with aspects of the present invention.

Turning now to drawings and referring first to FIG. 1, a motor drive system 10 is illustrated. The motor drive system 10 includes an AC-DC converter 12 configured to receive incoming AC voltage from a power source 14 and to convert the AC voltage to DC voltage. The motor drive system 10 also includes a DC-AC inverter 16 coupled to the AC-DC converter 12 by a DC bus 18. Further, a motor 20 is coupled to and driven by the inverter 16. In the illustrated embodiment, the motor drive system 10 further includes a load 22 coupled to and driven by the motor 20.

The motor drive system further includes a controller 24 operatively coupled to the converter 12, the inverter 16, the motor 20 and the load 22. The controller 24 is configured to control the voltage of the DC bus 18 based upon at least one operating parameter of the converter 12, the inverter 16, the motor 20 and the load 22. In one exemplary embodiment, the operating parameter includes voltage and current levels of the converter 12, the inverter 16, and the DC bus 18 and the motor and load torque and speed. In another exemplary embodiment, the operating parameter includes temperature of the converter 12, the inverter 16, the motor 20 or the load 22. In certain other embodiments, the operating parameter includes a motion profile of the motor 20 and the load 22.

In the illustrated embodiment, the motor drive system 10 includes filtration circuitry 26 for filtering higher order harmonics from AC voltage received from the power source 14. In certain embodiments, the filtration circuitry 26 includes an electromagnetic interference and harmonic filter. Further, the motor drive system 10 includes bus filtration circuitry 28 configured to filter harmonics associated with the DC bus 18. In operation, the controller 24 receives the operating parameters of the converter 12, the inverter 16, the motor 20 and the load 22 and generates control signals for regulating the DC bus voltage based upon the operating parameters.

In one embodiment, the operating parameters may be sensed using a sensing circuitry and the DC bus voltage profile may be determined in real-time using the sensed parameters. In another embodiment, such operating parameters may be stored and accessed by the controller 24 to adjust the DC bus voltage profile. In the illustrated embodiment, the motor drive system 10 includes an AC/DC control circuit 30 and a driver circuit 32 for controlling operation of the converter 12 to adjust the DC bus voltage profile. In addition, the motor drive system 10 also includes a DC/AC control circuit 34 and a driver circuit 36 for controlling operation of the inverter 16. In certain embodiments, a capacitive circuit 38 may be coupled across the DC bus 18.

Figure 2:
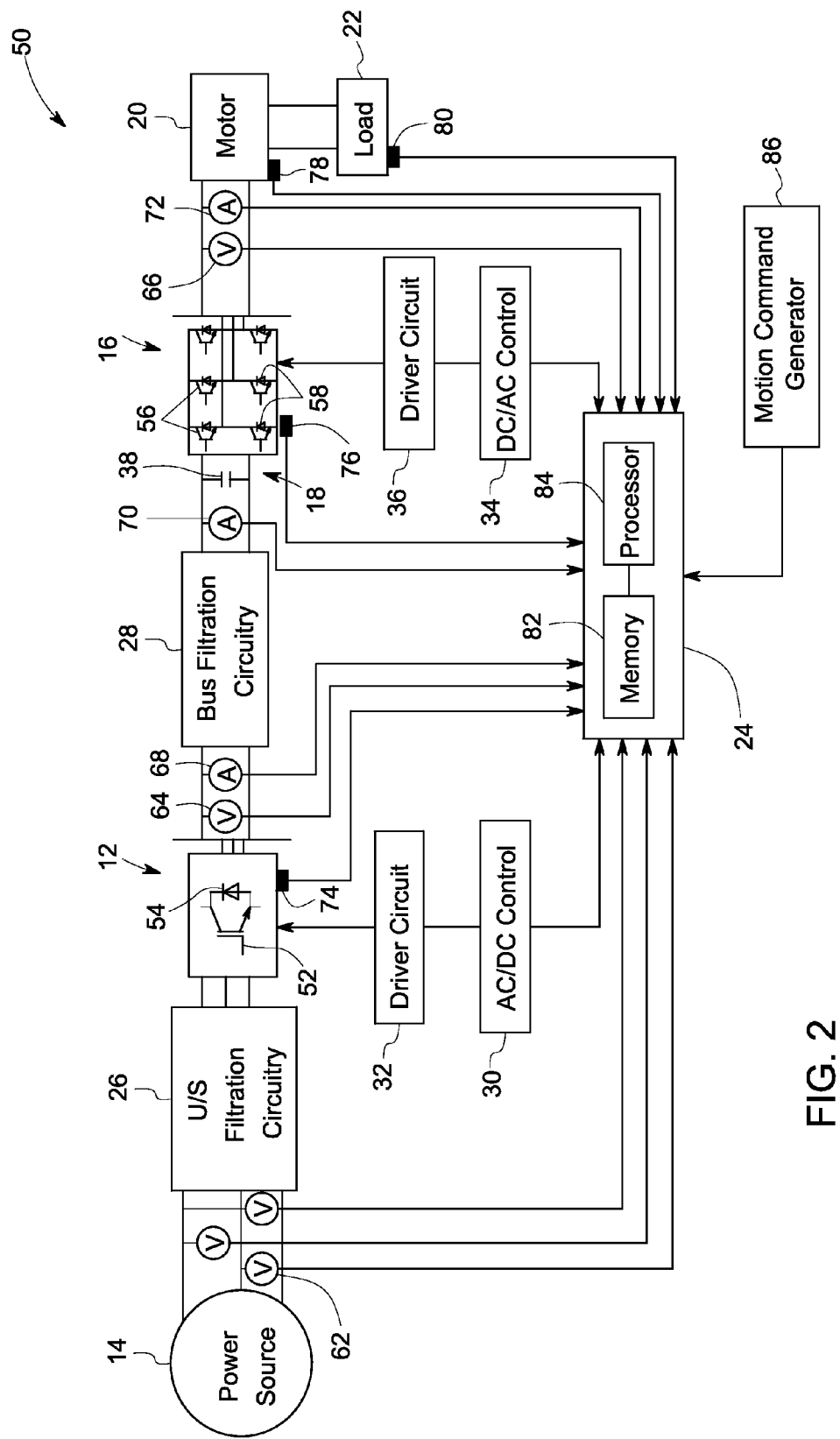
FIG. 2 illustrates an exemplary configuration of the motor drive system of FIG. 1 in accordance with aspects of the present invention.

FIG. 2 illustrates an exemplary configuration 50 of the motor drive system 10 of FIG. 1. In the illustrated embodiment, the power source 14 includes a three phase power supply that outputs three phase voltages and current waveforms out of phase with one another by $2\pi/3$ radians (e.g., from the power grid). However, other configurations of the input power source 14 with different numbers of phases (e.g., 1 or 2) and waveforms may be envisaged. The motor drive system 50 further includes the AC-DC converter 12 defined by a series of switches and associated diodes such as represented by reference numeral 52 and 54. The diode array converts incoming AC voltage from the power source 14 to DC voltage on the DC bus 18. A range of configurations may be provided for this circuitry (themselves of topologies known in the art), although the present technique contemplates the ability to perform switched conversion of incoming AC power to DC power in order to control the voltage of the DC bus (either higher or lower than the incoming AC mains voltage), as described below.

Moreover, the motor drive system 50 includes the DC-AC inverter 16 formed by an array of solid-state switches 56 and associated diodes 58 to convert DC voltage from the bus 20 to three-phase output AC voltage that is applied to an electrical device such as the motor 20. As will be appreciated by one skilled in the art, the switches 56 may include any suitable power electronic devices such as insulated gate bipolar transistors. The frequency of the output power may be altered as desired by the inverter 16 to control the speed and torque (and other performance parameters) of the motor 20. This allows for control of the motor 20 in accordance with a motion or load profile as described below.

The motor 20 may be of any desired physical and electrical configuration, such as a permanent magnet motor, an induction motor, a synchronous motor, and so forth, configured to receive power from the power bus 18 and to drive the load 22 such as an electrical machine or a process. In this exemplary embodiment, the motor 20 includes a three phase permanent magnet AC motor. It should be noted that a range of other components may be included in the motor drive system 50 illustrated in FIG. 2.

Moreover, a plurality of voltage sensors such as represented by reference numerals 62, 64 and 66 are employed to measure voltage levels of each of the converter 12, inverter 16 and the motor 20. In addition, a plurality of current sensors such as represented by reference numerals 68 and 70 are employed to measure current levels of each of the converter 12, inverter 16 and the motor 20. In certain configurations, lesser number of such sensors may be sufficient to measure voltage and current levels of the components of the motor drive system 50.

The motor drive system 50 may also include a plurality of temperature sensors such as represented by reference numerals 74, 76, 78 and 80 configured to sense temperature of at least one of the converter 12, inverter 16, motor 20 and the load 22. The voltage, current and temperature sensors are operatively coupled to the controller 24. In the illustrated embodiment, the controller 24 utilizes such sensed parameter to control the voltage of the DC bus 18.

Moreover, in certain applications the motor 20 (or some component associated with the motor) may be provided with an encoder or a similar device to measure the angular position of the motor shaft, from which velocity and acceleration data may be derived. In certain motors and associated control circuitry, this information may be estimated for "sensorless" control. Where such information is measured or estimated, the system may be controlled to implement a closed-loop velocity control regime, a torque-control regime, or other known techniques to track the desired motion and/or load profile of the application.

In the illustrated embodiment, the controller 24 includes a memory 82 to store the sensed operating parameters of the converter 12, inverter 16, motor 20 and the load 22. Further, the controller 24 also includes a processor 84 configured to generate control signals to adjust the bus voltage based upon the operating parameters. The memory 82 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

In one exemplary embodiment, the controller 24 is configured to access a motion profile for the motor 20 and the load 22. In certain embodiments, the motion profile may be obtained using an off-line motion command profile generator, 86. Furthermore, the controller 24 is configured to determine power losses of the converter 12, the inverter 16, the motor 20 and the load 22. The voltage of the DC bus 18 is controlled based upon the motion profile and the power losses to maximize the motor drive system efficiency. In one embodiment, the motion profile includes at least one of position, velocity and torque profiles of the motor 20 and the load 22. As will be appreciated by one skilled in the art the DC bus voltage control algorithm described above may be integrated with certain other components of the drive system and the DC bus voltage profile determined from the off-line motion command profile generator, 86.

In certain embodiments, the power losses of the converter 12 and the inverter 16 include losses of the components such as insulated gate bipolar transistors 52 and 56 and flyback diodes 54 and 58 of the converter 12 and the inverter 16. The power losses may further include inductor losses, or capacitive losses, or conduction losses, or switching losses, or combinations thereof. Moreover, the power losses of the motor 20 and the load 22 include copper losses, iron losses, mechanical losses, mechanism power losses, or combinations thereof.

In certain embodiments, a voltage profile of the DC bus 18 may be determined prior to the operation of the motor drive system 50 based on known commanded motion profiles. Further, such voltage profile may be regulated based upon the estimated power losses of the converter 12, the inverter 14, the motor 20 and the load 22 along with the motion profile. In one exemplary embodiment, the voltage of the DC bus 18 is adjusted to substantially reduce the electromagnetic interference of the motor drive system 50.

Figure 3:
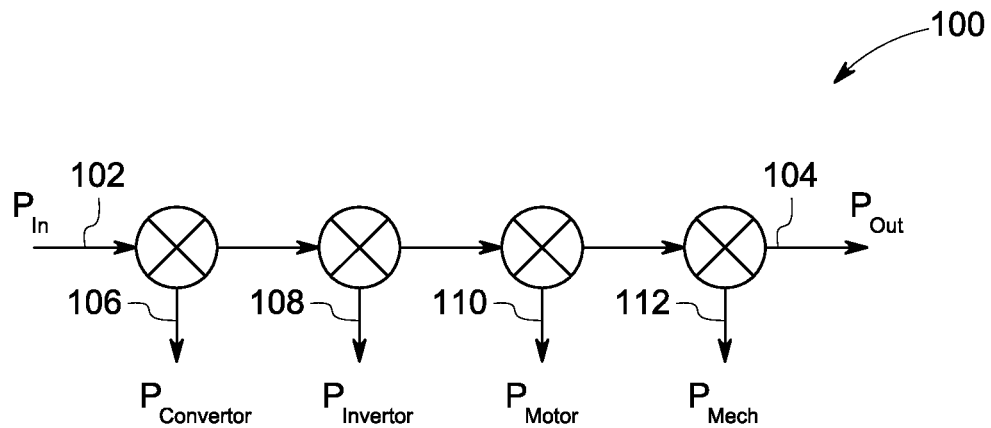
FIG. 3 illustrates exemplary power losses determined by the controller of the motor drive system of FIG. 2.

FIG. 3 illustrates exemplary power losses 100 determined by the controller 24 of the motor drive system 50 of FIG. 2. In the illustrated embodiment, an input power is represented by reference numeral 102 and the throughput power is represented by reference numeral 104. The controller 24 is configured to adjust the voltage of the DC bus 18 to minimize the system power losses 100. The system power losses 100 include losses 106 of the converter 12 that may include insulated gate bipolar transistors and fly back diodes losses along with other passive component losses such as inductor and capacitor losses.

The power losses 100 also include inverter losses 108 that may again include component losses as described above. Further, motor losses 110 may include copper and iron losses along with certain other mechanical losses. In this embodiment, power losses 100 also include mechanism power losses 112 of the components such as gears, bearings etc of the motor drive system 50. The throughput power 104 is estimated by deducting losses as described above from the input power 102.

The controller 24 is configured to estimate the efficiency of the system 50 using the input and throughput power 102 and 104. In this embodiment, the efficiency is estimated in accordance with the following relationship:

$$\eta = P_{out}/P_{in} \tag{1}$$

Where: $P_{out}$ is the throughput power; and
$P_{in}$ is the input power.

The controller 24 is configured to apply a DC bus voltage profile to enhance the efficiency of the system 50 using the calculated power losses of the motor drive system 50.

Figure 4:
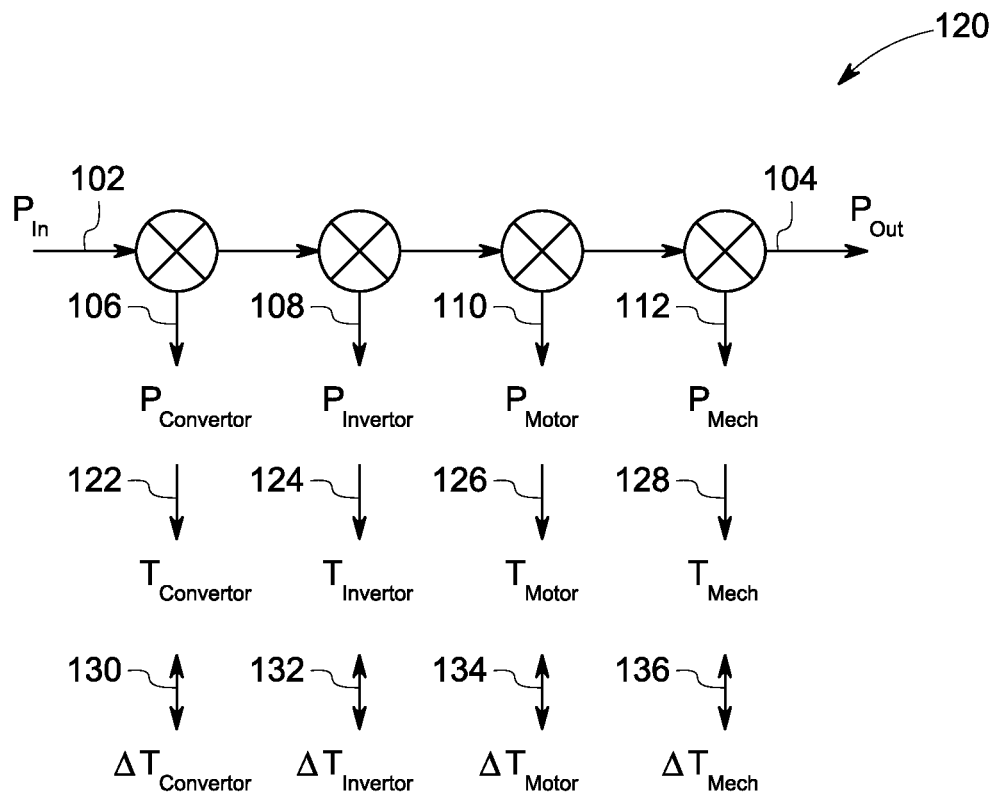
FIG. 4 illustrates exemplary temperature computations for the components of the motor drive system of FIG. 2.

FIG. 4 illustrates exemplary temperature computations 120 for the components of the motor drive system 50 of FIG. 2. In the illustrated embodiment, temperatures of the components such as the converter 12, the inverter 16, the motor 20 and other mechanisms are represented by reference numerals 122, 124, 126 and 128. Further, temperature changes for such components are represented by reference numerals 130, 132, 134 and 136 respectively. In this embodiment, the controller 24 employs the power loss model to minimize critical component temperatures 122, 124, 126 and 128 along with changes in their temperatures 130, 132, 134 and 136 resulting from intermittent duty operation or power cycling. Again, the DC bus voltage profile is adjusted to minimize the temperatures thereby enhancing the reliability of the motor drive system 50.

In certain exemplary embodiments, the DC bus voltage profile is controlled to substantially reduce a move time and move distance of the load 22 within the motor drive system 50. Further, a position or velocity or torque error may be reduced by adjusting the DC bus voltage. In particular, a motion move profile may be optimized based upon a torque-speed curve of the motor along with load characteristics.

In one exemplary embodiment, the DC voltage of the bus 18 may be regulated to substantially reduce conducted emissions from the motor drive system 50. In this embodiment, the DC bus voltage is regulated to substantially prevent operating conditions that result in high electromagnetic interference. Examples of such conditions include low current and zero speed operation of the motor drive system 50.

Figure 5:
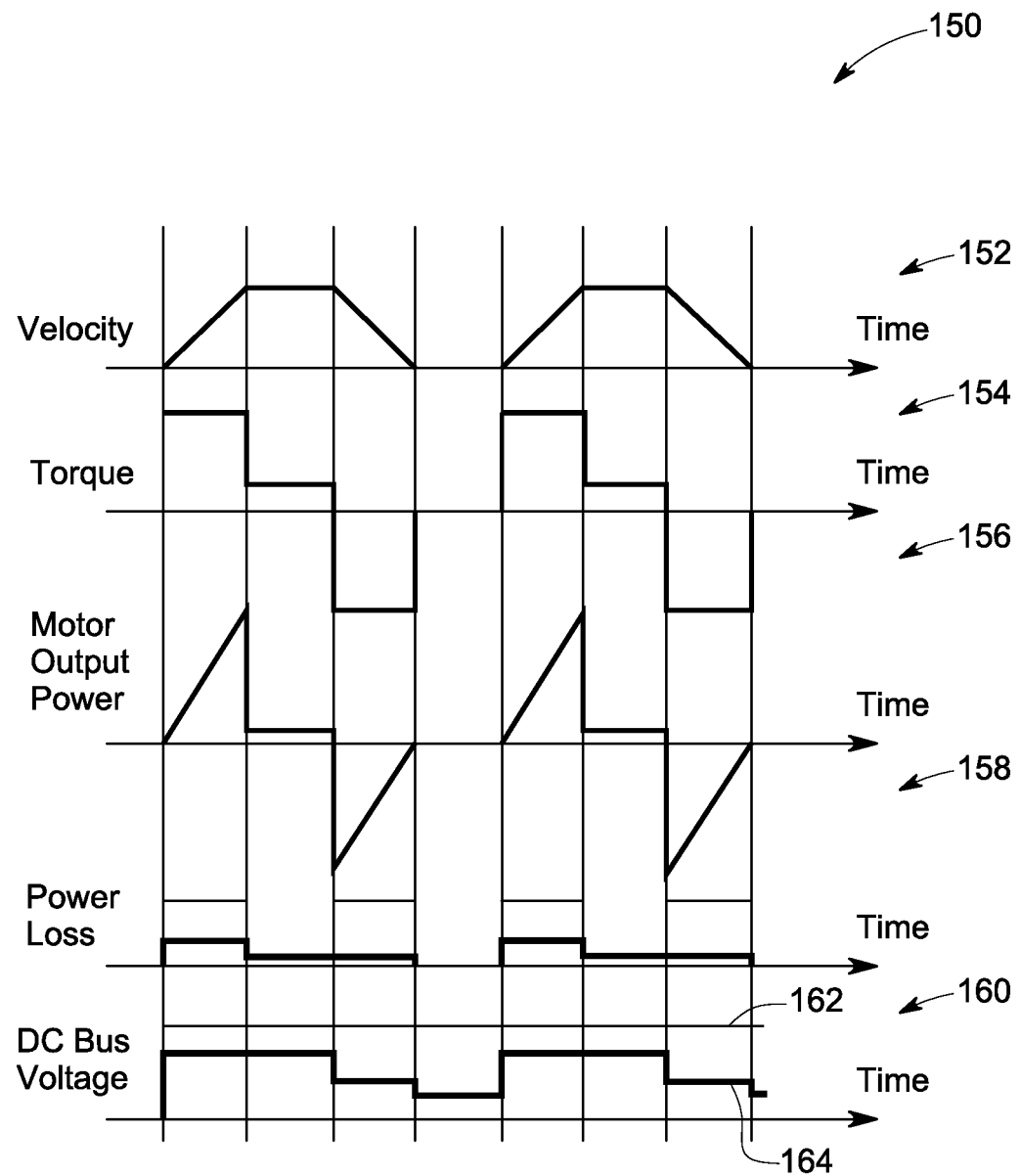
FIG. 5 illustrates exemplary profiles for operating parameters and DC bus voltage for the motor drive system of FIG. 2.

FIG. 5 illustrates exemplary profiles 150 for operating parameters and optimized DC bus voltage profile for the motor drive system 50 of FIG. 2. In this exemplary embodiment, velocity and torque profiles of the motor drive system 50 are represented by reference numerals 152 and 154. Further, motor output power profile is represented by reference numeral 156. In the illustrated embodiment, the motor output power profile 156 is estimated based upon the velocity and torque profiles 152 and 154 and is represented by the following equation:

$$P_{motor} = \tau \times v \tag{2}$$

Where
$P_{motor}$ is the motor output power;
$\tau$ is torque of the motor; and
$v$ is the velocity of the motor.

Moreover, power losses for the motor drive system 50 are represented by profile 158. As described before, the motor losses 158 may include power losses of each of the components of the motor drive system 50 such as motor power losses, losses of insulated gate bipolar transistors, inductor and capacitor losses and so forth. Exemplary DC bus voltage profiles for the motor drive system are represented by reference numeral 160. As illustrated, a constant DC bus voltage profile typically employed by motor drive systems is represented by reference numeral 162. Moreover, an optimized DC bus voltage profile obtained to substantially reduce the power losses 158 of the motor drive system 50 is represented by reference numeral 164.

As described above, the DC bus voltage profile 164 is customized for a particular motor drive system with specified motor parameters and load characteristics based upon the operating parameters and the motion profile of the motor and the load. Advantageously, such customization enhances the efficiency, reliability and performance of such systems while reducing electromagnetic interference of the system 50.

Figure 6:
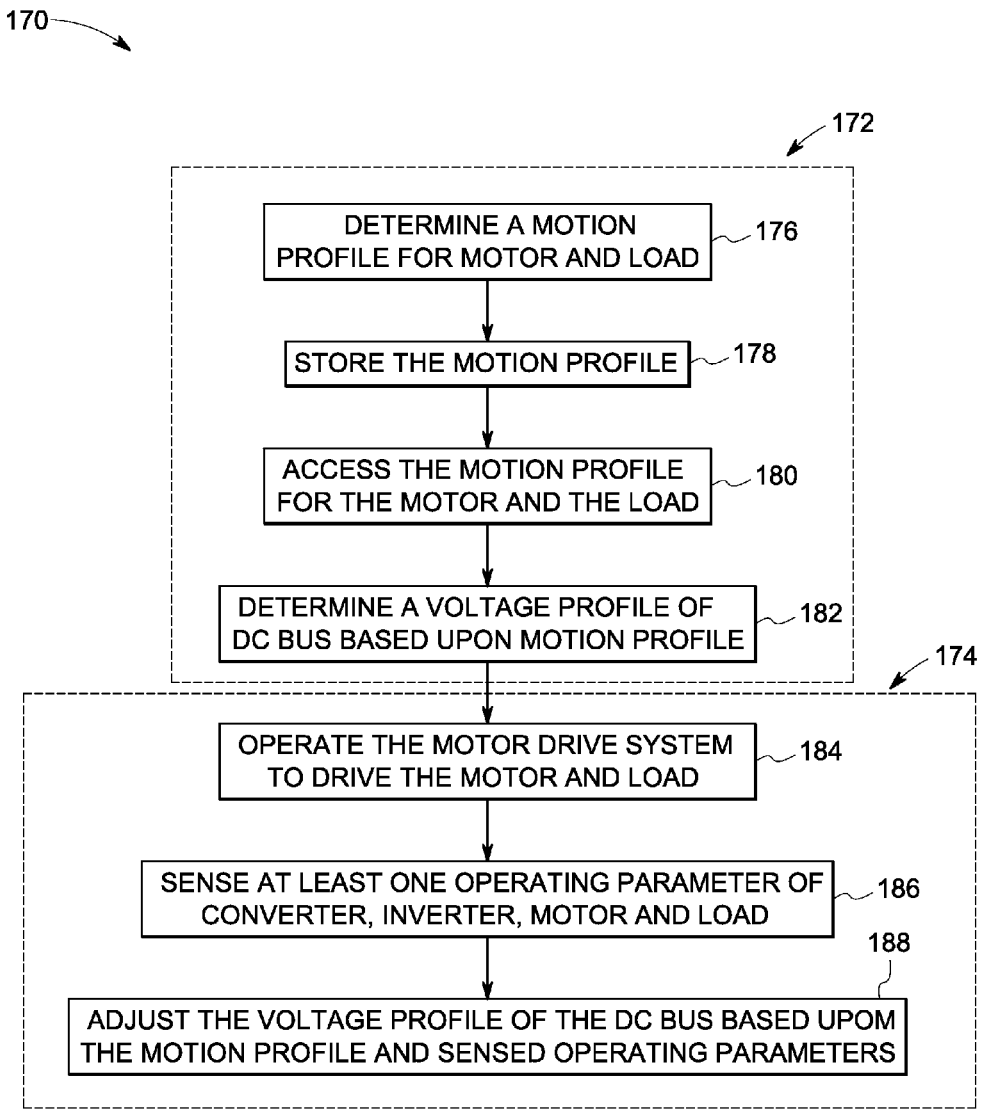
FIG. 6 illustrates an exemplary method for controlling the motor drive system of FIG. 2.

FIG. 6 illustrates an exemplary method 170 for controlling the motor drive system 50 of FIG. 2. In the illustrated embodiment, reference numerals 172 and 174 represent process steps performed prior to and during operation of the motor drive system respectively. At block 176, a motion profile for the motor and the load is determined. In one embodiment, the motion profile is obtained through an off-line motion command generator. The motion profile is determined based on the desired motion characteristics of the load 22 within the motor drive system 50. In one embodiment, the motion profile is stored in a memory circuitry (block 178).

Further, the motion profile is accessed by a controller and a voltage profile of the DC bus is determined based upon the motion profile of the motor and the load (blocks 180 and 182). At block 184, the motor drive system is operated to drive the motor and the load. The motor drive system is operated by applying the voltage profile of the DC bus. During operation of the motor drive system, at least one operating parameter of the converter, the inverter, the motor and the load is sensed using a sensing circuitry (block 186). At block 188, the voltage profile of the DC bus is adjusted based upon the motion profile and the sensed operating parameters.

As described above, the operating parameters may include voltage and current levels of the converter, inverter and the DC bus, or temperature of the converter, the inverter, the motor or the load, or combinations thereof. Further, other operating parameters may include position of the motor, or velocity of the motor, or torque of the motor, or combinations thereof. In this embodiment, the adjusted DC bus voltage profile is applied to the motor drive system. In particular, control signals corresponding to the adjusted DC bus voltage profile may be generated and applied to the various components of the motor drive system to maintain the desired DC bus voltage.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or JAVA.

Such code, as will be appreciated by those of ordinary skill in the art, may be stored or adapted for storage on one or more tangible, machine readable media, such as on memory chips, local or remote hard disks, optical disks (e.g., CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The various aspects of the structures described hereinabove may be used for optimizing DC bus voltage in motor drive systems. In particular, the technique described above provides dynamic adjustment of the DC bus voltage based upon operating parameters of such systems for enhancing the drive system efficiency, reliability and/or motor shaft performance. The technique may be employed in industrial automation applications using controllers such as described above for regulating the DC bus voltage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a motor drive system, the system comprising an AC-DC converter coupled to a DC-AC inverter by a DC bus, a motor coupled to and driven by the inverter, and a load coupled to and driven by the motor, the method comprising:
   accessing a motion profile for the motor and load;
   determining power losses of the converter, the inverter, the motor and the load; and
   controlling the voltage of the DC bus based upon the motion profile and the power losses.

2. The method of claim 1, wherein the motion profile comprises at least one of position, velocity and torque profiles of the motor and the load.

3. The method of claim 1, further comprising:
   determining a voltage profile of the DC bus prior to operation of the motor drive system; and
   regulating the voltage profile during operation of the motor drive system based upon the power losses of the converter, the inverter, the motor and the load and the motion profile.

4. The method of claim 3, comprising:
   measuring current and voltage levels respectively associated with each of the converter, the inverter and the DC bus; and
   adjusting the voltage profile based upon the measured current and voltage levels.

5. The method of claim 3, comprising:
   sensing and/or calculating temperature of at least one of the converter, the inverter, the motor and the load; and
   adjusting the voltage profile to substantially reduce the temperature of at least one of the converter, the inverter, the motor and the load.

6. The method of claim 1, wherein the power losses of the converter and the inverter comprise losses of insulated gate bipolar transistors and fly back diodes of the converter and the inverter, or inductor losses, or capacitive losses, or power supply losses, or switching losses, or combinations thereof.

7. The method of claim 1, wherein the power losses of the motor and the load comprise copper losses, iron losses, mechanical losses, mechanism power losses, or combinations thereof.

8. The method of claim 1, wherein controlling the voltage of the DC bus comprises adjusting the DC bus voltage to substantially reduce the electromagnetic interference of the motor drive system.

9. A method for controlling a motor drive system, the system comprising an AC-DC converter coupled to a DC-AC inverter by a DC bus, a motor coupled to and driven by the inverter, and a load coupled to and driven by the motor, the method comprising:
   accessing a motion profile for the motor and the load;
   determining a voltage profile of the DC bus based upon the motion profile;
   operating the motor drive system to drive the motor and the load;
   sensing at least one operating parameter of the converter, the inverter, the motor and the load; and
   adjusting the voltage profile of the DC bus based upon the motion profile and the sensed operating parameters.

10. The method of claim 9, further comprising applying the adjusted DC bus voltage profile to the motor drive system.

11. The method of claim 9, wherein the at least one operating parameter comprises voltage and current levels of the converter, inverter and the DC bus, or temperature of the converter, the inverter, the motor or the load, or combinations thereof.

12. The method of claim 9, wherein the at least one operating parameter comprises position of the motor, or velocity of the motor, or torque of the motor, or combinations thereof.

13. The method of claim 9, further comprising controlling motion move profile of the load based upon the motion profile of the motor and load characteristics.

14. A motor drive system, comprising:
   an AC-DC converter configured to convert incoming AC voltage from a power source to DC voltage;
   a DC-AC inverter coupled to the AC-DC converter by a DC bus;
   a motor coupled to and driven by the inverter;
   a load coupled to and driven by the motor; and
   a controller operatively coupled to the converter, the inverter, the motor and the load and configured to control the voltage of the DC bus based upon a motion profile of the load and motor, and at least one of reliability and efficiency of the converter, the inverter, and the motor.

15. The motor drive system of claim 14, wherein the controller is configured to control the voltage of the DC bus by controlling voltage and current levels of the converter, inverter and the DC bus, or temperature of the converter, the inverter, the motor or the load, or combinations thereof 16. The motor drive system of claim 14, wherein the controller is further configured to control a motion move profile of the load.

17. The motor drive system of claim 14, further comprising a sensing circuitry in communication with the controller, wherein the sensing circuit comprises a plurality of voltage sensors and a plurality of current sensors configured to measure voltage and current levels respectively of each of the converter, the inverter and the motor.

18. The motor drive system of claim 17, wherein the controller further comprises:
   a memory configured to store the sensed voltage and current levels of the converter, the inverter, the motor and the load; and
   a processor configured to generate control signals to adjust the bus voltage based upon the sensed voltage and current levels.

19. The motor drive system of claim 14, wherein the controller is disposed within an off-line motion command generator of the motor drive system.

20. The motor drive system of claim 14, wherein the motor comprises a three phase motor.

* * * * *